US012681361B2

(12) United States Patent
Lee et al.

(10) Patent No.: US 12,681,361 B2
(45) Date of Patent: Jul. 14, 2026

(54) APERTURE MODULE AND CAMERA MODULE INCLUDING THE SAME

(71) Applicant: SAMSUNG ELECTRO-MECHANICS CO., LTD., Suwon-si (KR)

(72) Inventors: Kyung Hun Lee, Suwon-si (KR); Jae Hyung Han, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 199 days.

(21) Appl. No.: 18/394,116

(22) Filed: Dec. 22, 2023

(65) Prior Publication Data

US 2024/0219811 A1 Jul. 4, 2024

(30) Foreign Application Priority Data

Jan. 4, 2023 (KR) ........................ 10-2023-0001313
Jul. 6, 2023 (KR) ........................ 10-2023-0087971

(51) Int. Cl.
| | |
|---|---|
| *G03B 9/22* | (2021.01) |
| *G03B 9/06* | (2021.01) |
| *G03B 17/12* | (2021.01) |
| *G03B 30/00* | (2021.01) |

(52) U.S. Cl.
CPC ................. *G03B 9/22* (2013.01); *G03B 9/06* (2013.01); *G03B 17/12* (2013.01); *G03B 30/00* (2021.01)

(58) Field of Classification Search
CPC ................................. G03B 9/06; G03B 30/00
See application file for complete search history.

(56) References Cited

U.S. PATENT DOCUMENTS

| | | | | | |
|---|---|---|---|---|---|
| 8,475,064 | B2 * | 7/2013 | Bai | ........................ | G03B 9/18 |
| | | | | | 396/463 |
| 2020/0064711 | A1 | 2/2020 | Kim et al. | | |
| 2023/0341746 | A1 * | 10/2023 | Chen | ...................... | G03B 9/06 |
| 2024/0152032 | A1 * | 5/2024 | Chang | .................... | G03B 9/06 |

FOREIGN PATENT DOCUMENTS

| | | | | | |
|---|---|---|---|---|---|
| CN | 115494682 | A | * | 12/2022 | ......... H04M 1/0202 |
| KR | 10-2009-0124296 | A | | 12/2009 | |
| KR | 10-2009-0128352 | A | | 12/2009 | |
| KR | 10-0975630 | B1 | | 8/2010 | |
| KR | 10-2139767 | B1 | | 7/2020 | |
| KR | 10-2021-0002273 | A | | 1/2021 | |

OTHER PUBLICATIONS

Korean Office Action issued on Aug. 20, 2025, in corresponding Korean Patent Application No. 10-2023-0087971. (5 pages in English, 4 pages in Korean).

* cited by examiner

*Primary Examiner* — Leon W Rhodes, Jr.
(74) *Attorney, Agent, or Firm* — NSIP Law

(57) ABSTRACT

An aperture module includes a base; a rotor rotatably disposed with respect to the base; a plurality of blades interlockable with the rotor rotating to form incidence holes of various sizes; a rolling portion, including a plurality of rolling balls, disposed between the base and the rotor; and an aperture driver including a magnet portion disposed on one of the base or the rotor, and a coil portion disposed to face the magnet portion. The magnet portion includes a first aperture magnet and a second aperture magnet spaced apart from each other. Attractive force acts on either one of the first aperture magnet or the second aperture magnet in at least two directions intersecting each other.

19 Claims, 13 Drawing Sheets

8000

8500     8300    8100

APERTURE MODULE AND CAMERA MODULE INCLUDING THE SAME

CROSS-REFERENCE TO RELATED APPLICATIONS

This application claims the benefit under 35 USC § 119(a) of Korean Patent Application No. 10-2023-0001313, filed on Jan. 4, 2023, and Korean Patent Application No. 10-2023-0087971, filed on Jul. 6, 2023, in the Korean Intellectual Property Office, the entire disclosures of which are incorporated herein by reference for all purposes.

FIELD

The present disclosure relates to an aperture module and a camera module including the same.

DESCRIPTION OF THE BACKGROUND

Recently, a camera module has been employed in portable electronic devices such as a smartphone, a tablet PC, a laptop computer, or the like.

Additionally, recently, an aperture module capable of controlling an amount of light has been applied to a camera module for a mobile device.

A conventional aperture module has a plurality of blades that form an incidence hole, and the size of the incidence hole may be adjusted by changing the positions of the plurality of blades with a driver. For example, the size of the incidence hole may be adjusted by changing a linear movement of a magnet into a rotational movement of the plurality of blades.

However, in the conventional aperture module, in a state in which power is not supplied to the driver (i.e., an aperture module is turned off) and when there is a factor such as an external shock or the like, there is a problem that the positions of the plurality of blades are distorted, resulting in a change in the size of the incidence hole.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspect, an aperture module includes a base; a rotor rotatably disposed with respect to the base; a plurality of blades interlockable with the rotor rotating to form incidence holes of various sizes; a rolling portion, including a plurality of rolling balls, disposed between the base and the rotor; and an aperture driver including a magnet portion disposed on one of the base or the rotor, and a coil portion disposed to face the magnet portion. The magnet portion includes a first aperture magnet and a second aperture magnet spaced apart from each other. Attractive force acts on either one of the first aperture magnet or the second aperture magnet in at least two directions intersecting each other.

The aperture module may further include a first pulling yoke disposed to face the first aperture magnet in an optical axis direction, and a second pulling yoke disposed to face the second aperture magnet in the optical axis direction. The magnet portion and the coil portion may face each other in the optical axis direction.

An area of the first pulling yoke facing the first aperture magnet may be larger than an area of the second pulling yoke facing the second aperture magnet.

Based on a virtual line crossing a center of the first pulling yoke, an area of one side of the first pulling yoke may be larger than an area of another side of the first pulling yoke.

The aperture module may further include an auxiliary yoke disposed adjacent to the first pulling yoke.

At least a portion of the auxiliary yoke may face the first aperture magnet in a direction perpendicular to the optical axis direction.

An upper end of the auxiliary yoke may be located between upper and lower surfaces of the first aperture magnet.

The rolling portion may include a first rolling member including a first rolling ball and a second rolling ball, and a second rolling member including a third rolling ball. The first rolling member may be disposed closer to the first aperture magnet than to the second rolling member.

The base may include a 1-1 guide groove, a 1-2 guide groove, and a 1-3 guide groove. The rotor may include a 2-1 guide groove, a 2-2 guide groove, and a 2-3 guide groove. The first rolling ball may be disposed to contact the 1-1 guide groove and the 2-1 guide groove, facing each other. The second rolling ball may be disposed to contact the 1-2 guide groove and the 2-2 guide groove, facing each other. The third rolling ball may be disposed to contact the 1-3 guide groove and the 2-3 guide groove, facing each other. A number of contact points of the third rolling ball may be smaller than a number of contact points of the first rolling ball and a number of contact points of the second rolling ball.

A distance between a surface of the 1-3 guide groove and a surface of the 2-3 guide groove, facing in a direction, perpendicular to the optical axis direction, may be greater than a diameter of the third rolling ball.

Guide grooves of the base and the rotor may each have a bottom surface and a side surface extending from the bottom surface in the optical axis direction, and the side surface may be a curved surface.

A bottom surface of the 1-1 guide groove and a bottom surface of the 2-1 guide groove may face each other in the optical axis direction, and a side surface of the 1-1 guide groove and a side surface of the 2-1 guide groove may face each other in a direction perpendicular to the optical axis direction. A bottom surface of the 1-2 guide groove and a bottom surface of the 2-2 guide groove may face each other in the optical axis direction, and a side surface of the 1-2 guide groove and a side surface of the 2-2 guide groove may face each other in a direction perpendicular to the optical axis direction.

A camera module may include the aperture module above; a lens module movable along three axes perpendicular to each other; and a housing accommodating the lens module. The aperture module may be coupled to, and movable with, the lens module.

A portable electronic device may include the camera module above, and an image sensor module configured to convert light incident through the lens module into an electrical signal.

In another one or more general aspect, a camera module includes a lens module movable along three axes perpendicular to each other; a housing accommodating the lens module; and an aperture module, coupled to the lens module and movable with the lens module. The aperture module includes a base; a rotor rotatably disposed with respect to the base; a plurality of blades interlockable with the rotor rotating to form incidence holes of various sizes; an aperture driver including a magnet portion disposed on the rotor, and a coil portion disposed on the base; and a pulling yoke portion disposed on the base to face the magnet portion. The magnet portion includes a first aperture magnet and a second aperture magnet, spaced apart from each other. The pulling yoke portion includes a first pulling yoke facing the first aperture magnet, and a second pulling yoke facing the second aperture magnet. An area of the first pulling yoke facing the first aperture magnet is larger than an area of the second pulling yoke facing the second aperture magnet.

The camera module may further include an auxiliary yoke disposed on the base. At least a portion of the auxiliary yoke may face the first aperture magnet, and a direction in which the first aperture magnet and the first pulling yoke face each other may be perpendicular to a direction in which the first aperture magnet and the auxiliary yoke face each other.

The camera module may further include a rolling portion disposed between the base and the rotor. The rolling portion may include a first rolling member including a first rolling ball and a second rolling ball, and a second rolling member including a third rolling ball. The first aperture magnet may be disposed between the first rolling ball and the second rolling ball, when viewed in the optical axis direction.

The camera module may further include a case coupled to the housing; an aperture substrate on which the coil portion being mounted and disposed on the base; and a connection substrate including a fixed portion coupled to the case, a moving portion coupled to the base, and a connection portion connecting the fixed portion and the moving portion. When the lens module and the aperture module move together, at least a portion of the connection portion may be configured to bend.

A portable electronic device may include the camera module above, and an image sensor module configured to convert light incident through the lens module into an electrical signal.

Other features and aspects will be apparent from the following detailed description, the drawings, and the claims.

4

Figure 10:
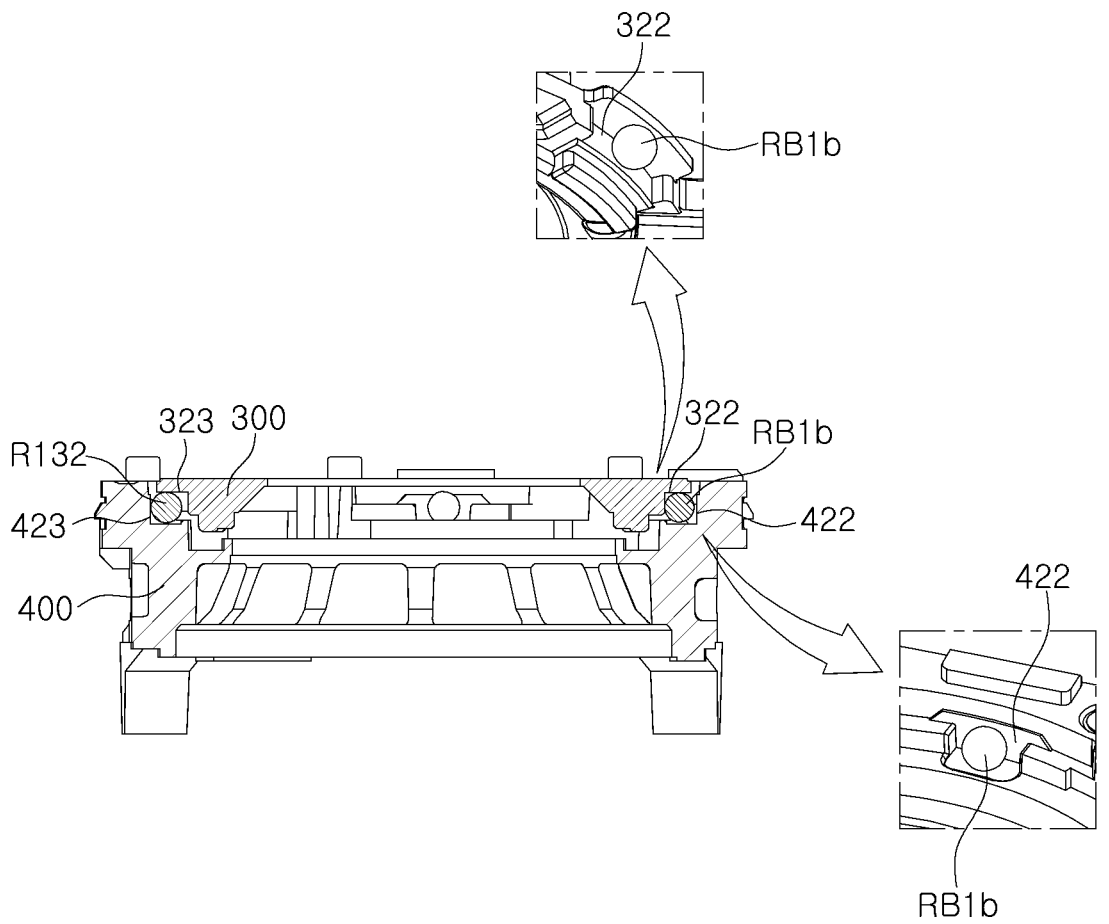

FIG. 10 is a schematic cross-sectional view of an aperture module illustrating an arrangement of first and second rolling members.

Figure 11:
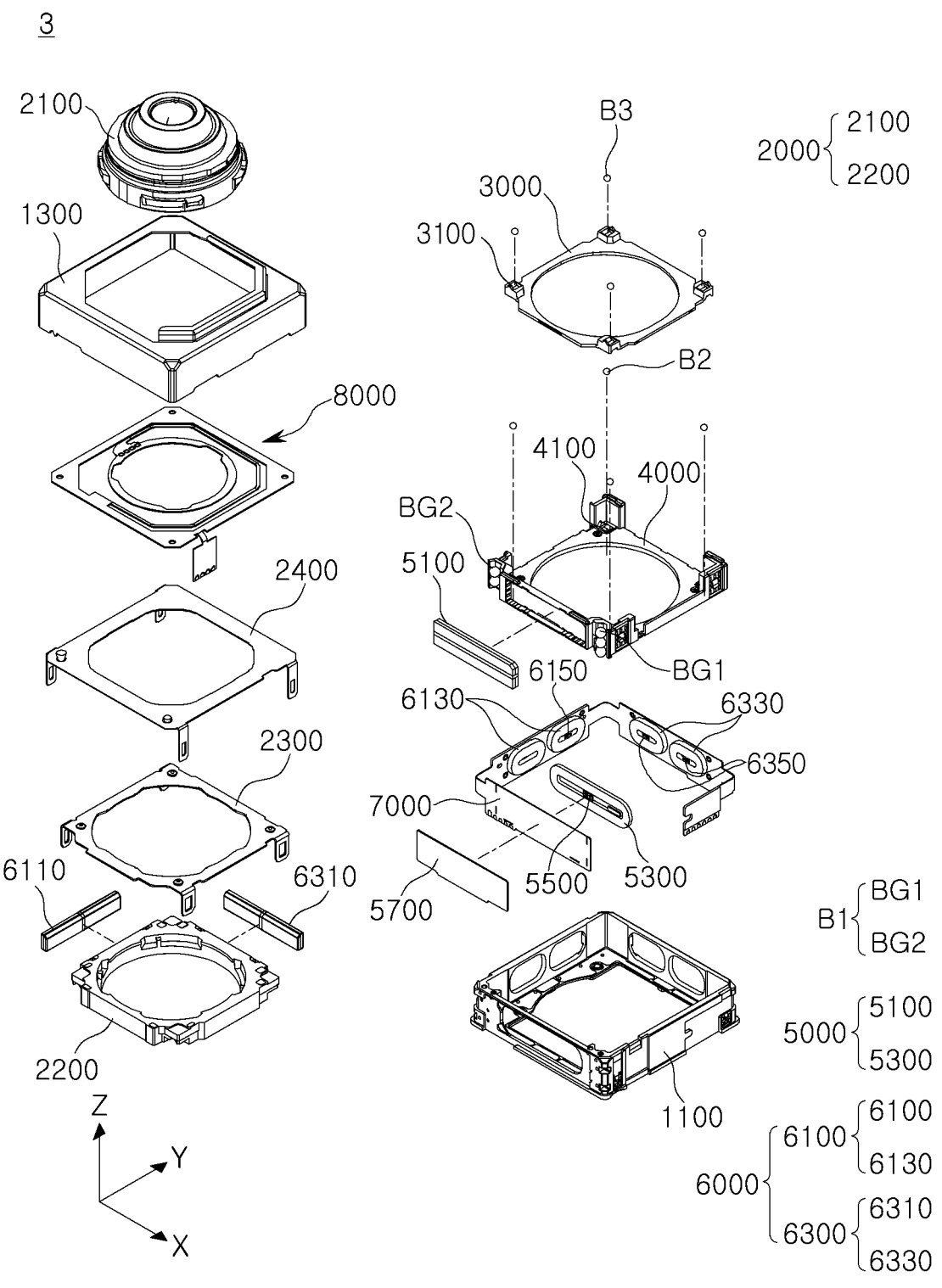

FIG. 11 is an exploded perspective view of a camera actuator according to an embodiment.

Figure 12:
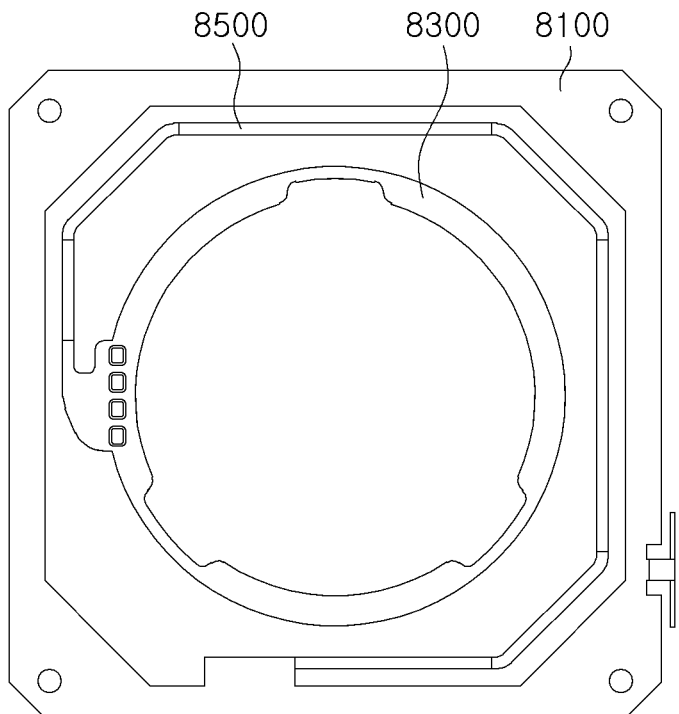

FIG. 12 is a top view of a connection substrate of a camera actuator.

Figure 13:
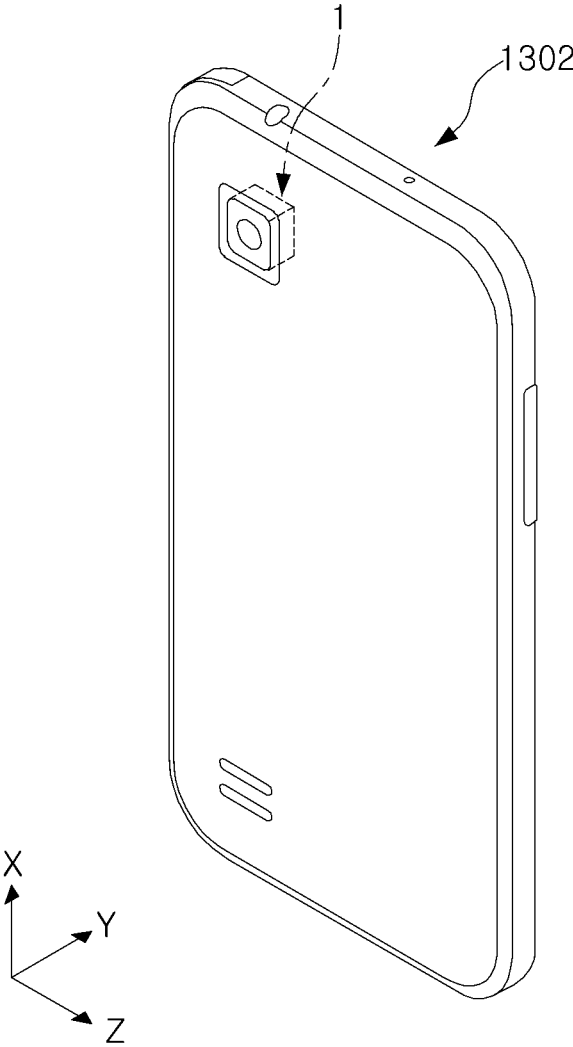

FIG. 13 is a perspective view of a portable electronic device according to an example.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Due to manufacturing techniques and/or tolerances, variations of the shapes shown in the drawings may occur. Thus, the examples described herein are not limited to the specific shapes shown in the drawings, but include changes in shape that occur during manufacturing.

The present disclosure relates to an aperture module and a camera module including the same, and the camera module may be mounted on a portable electronic device such as a mobile communication terminal, a smartphone, a tablet PC, or the like.

Figure 1:
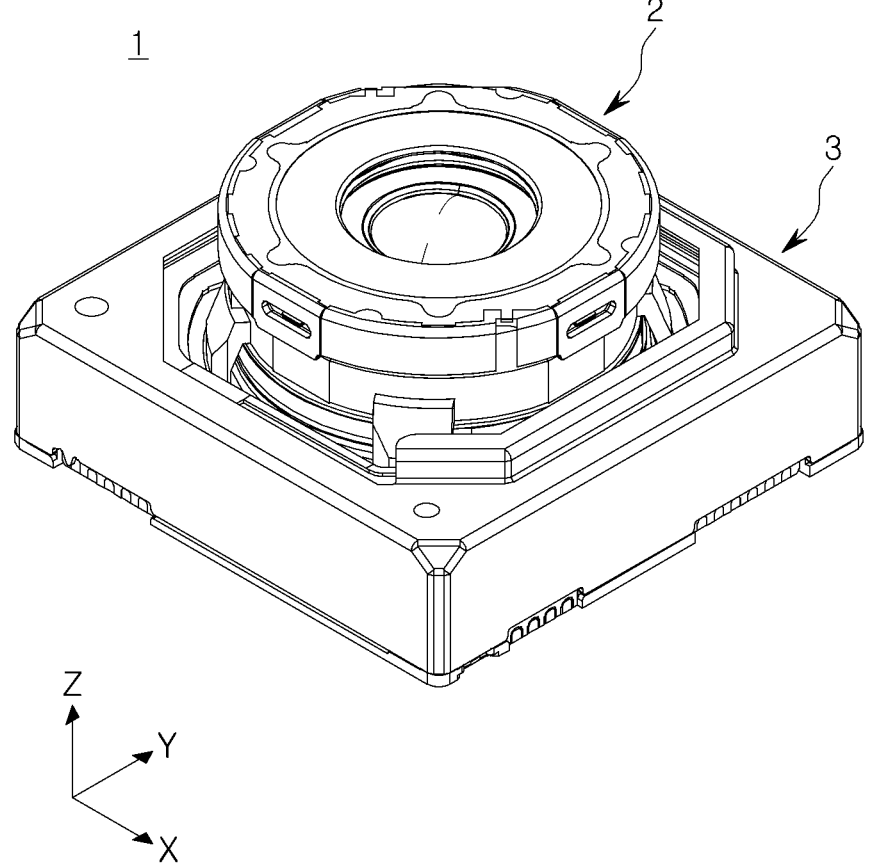
FIG. 1 is a perspective view of a camera module according to an embodiment of the present disclosure.
Figure 2:
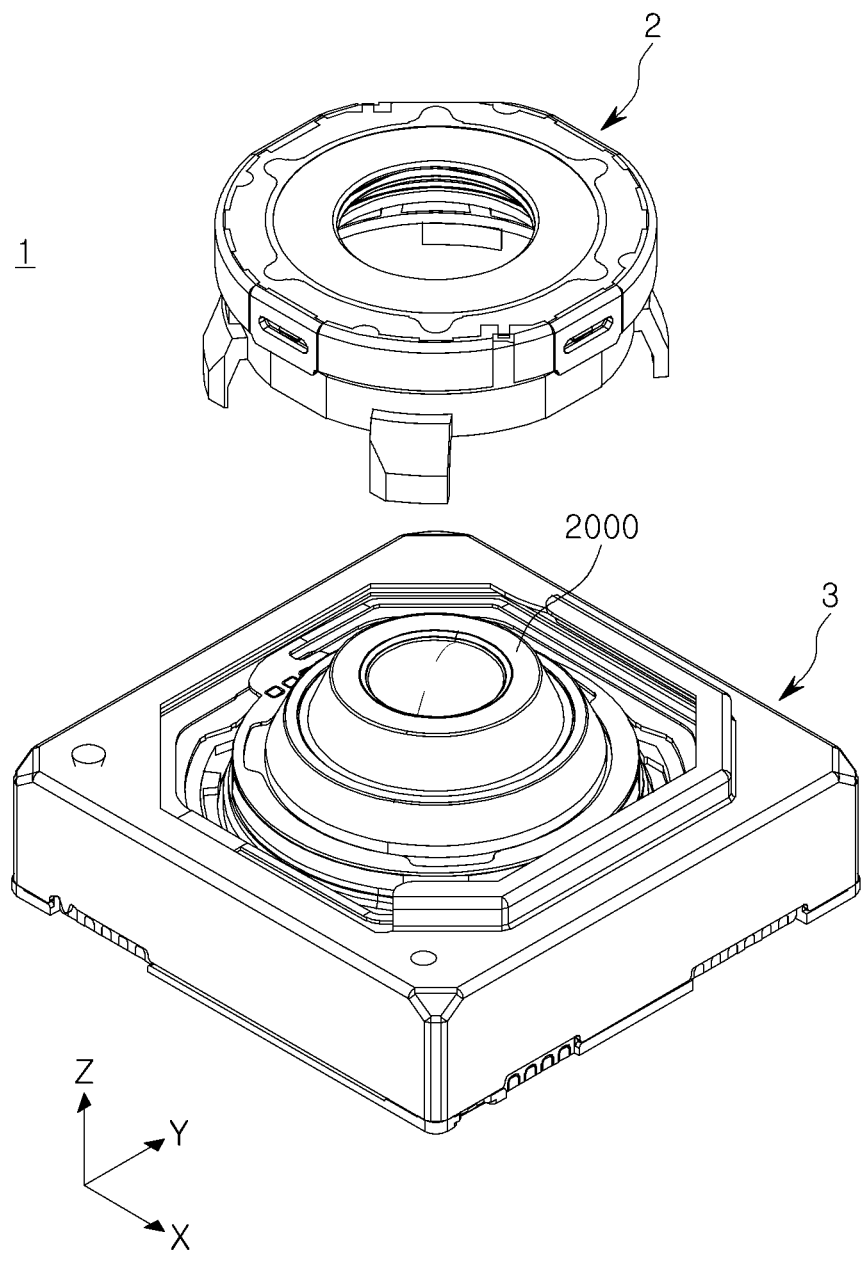
FIG. 2 is a perspective view illustrating a configuration in which an aperture module and a camera actuator are separated.

FIG. 1 is a perspective view of a camera module according to an embodiment of the present disclosure, and FIG. 2 is a perspective view illustrating a configuration in which an aperture module and a camera actuator are separated.

Referring to FIGS. 1 and 2, a camera module 1 according to an embodiment of the present disclosure may include an aperture module 2 and a camera actuator 3. The camera module 1 may be mounted in a portable electronic device 1302 show in FIG. 13.

The camera actuator 3 may include a housing 1100 having an internal space, and a lens module 2000 disposed in the housing 1100. The lens module 2000 may move in an optical axis (Z-axis) direction for focus adjustment. Additionally, the lens module 2000 may move in a direction, perpendicular to the optical axis (Z-axis), for shake correction.

The aperture module 2 may be coupled to the camera actuator 3, and may control the amount of light incident on the camera actuator 3. For example, the aperture module 2 may have an incidence hole 210 through which light passes, and the amount of light incident on the camera actuator 3 may be adjusted by changing the size of the incidence hole 210.

The aperture module 2 may be configured to be coupled to the lens module 2000 and move together with the lens module 2000. In another embodiment, it is possible to configure the aperture module 2 to be fixed to the housing 1100.

Figure 3:
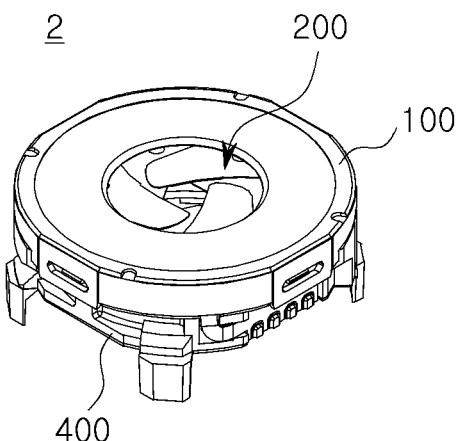
FIG. 3 is a perspective view illustrating a state in which an aperture module, according to an embodiment of the present disclosure, has a relatively narrow incidence hole.
Figure 4:
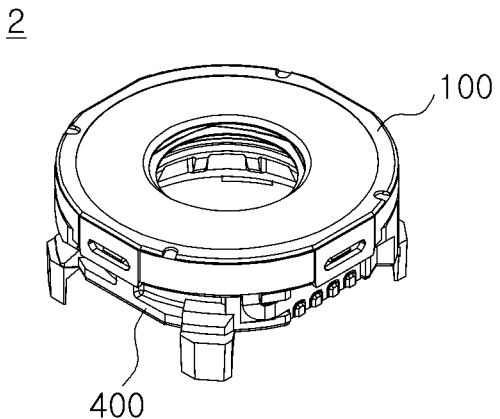
FIG. 4 is a perspective view illustrating a state in which an aperture module, according to an embodiment of the present disclosure, has a relatively large incidence hole.

FIG. 3 is a perspective view illustrating a state in which an aperture module according to an embodiment of the present disclosure has a relatively narrow incidence hole, and FIG. 4 is a perspective view illustrating a state in which an aperture module according to an embodiment of the present disclosure has a relatively large incidence hole.

Figure 5:
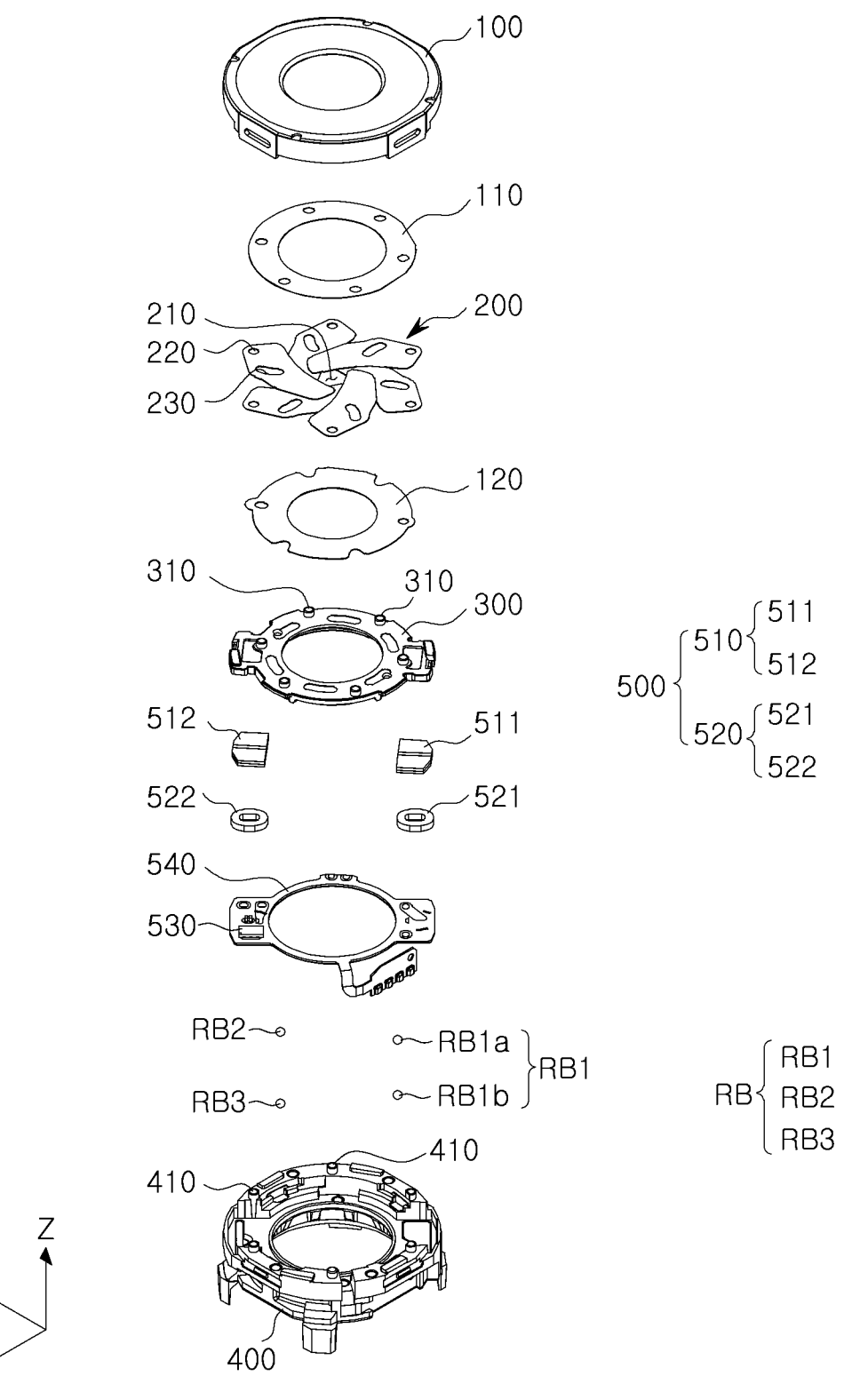
FIG. 5 is an exploded perspective view of FIG. 3.
Figure 6:
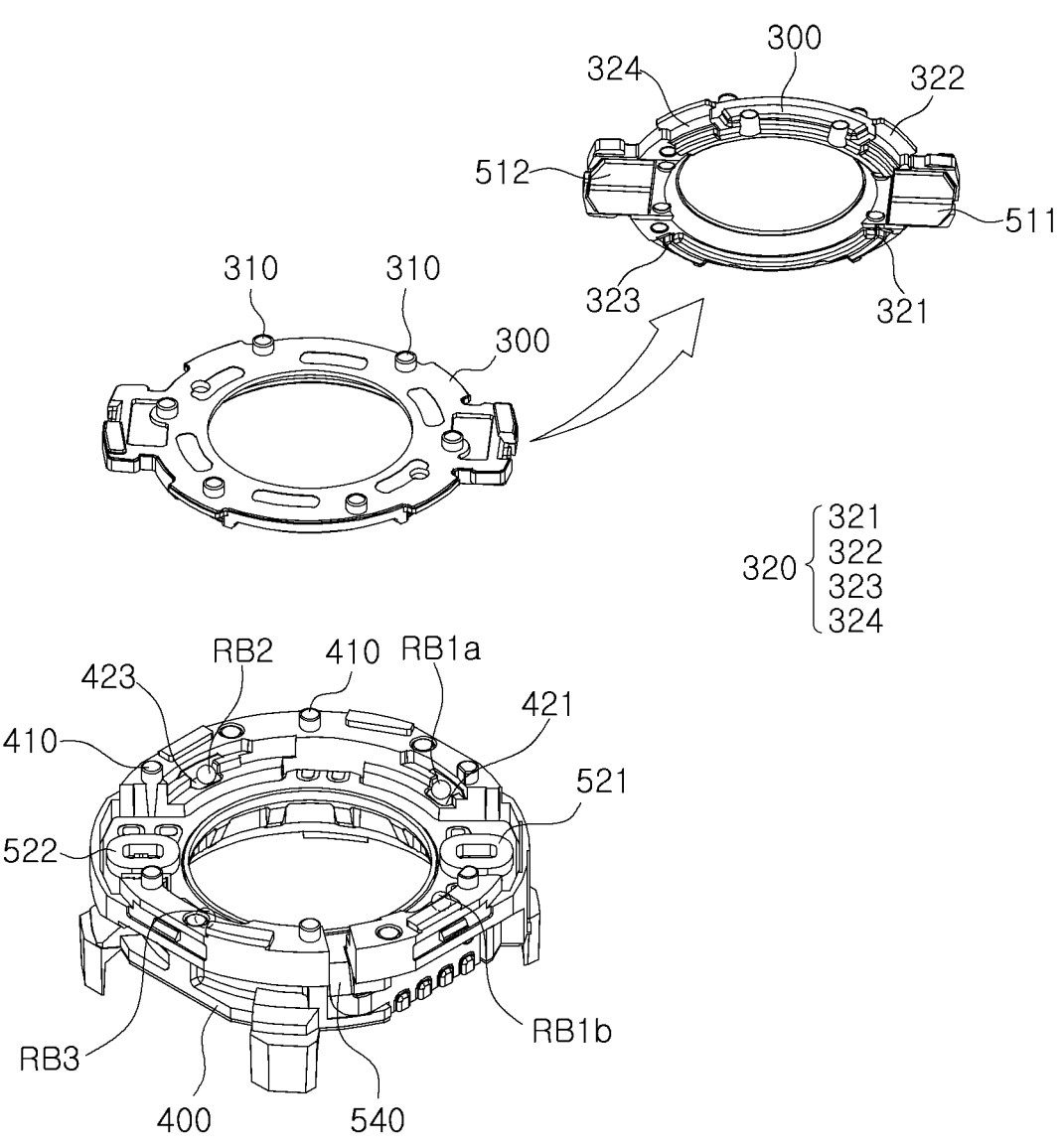
FIG. 6 is an exploded perspective view illustrating a configuration in which an aperture driver is disposed on a base and a rotor.

In addition, FIG. 5 is an exploded perspective view of FIG. 3, and FIG. 6 is an exploded perspective view illustrating a configuration in which an aperture driver is disposed on a base and a rotor.

Referring to FIGS. 3 to 6, an aperture module 2 according to an embodiment of the present disclosure may include a base 400, a rotor 300, a plurality of blades 200, and an aperture driver 500.

The base 400 may be coupled to a camera actuator 3. For example, the base 400 may be coupled to a lens module 2000 of the camera actuator 3. In this case, the aperture module 2 may move together with the lens module 2000, as the lens module 2000 moves.

In another embodiment, the base 400 may be coupled to a housing 1100 of the camera actuator 3. In this case, the aperture module 2 may remain fixed, when the lens module 2000 moves.

The rotor 300 may rotate relative to the base 400. For example, the rotor 300 may be spaced apart from the base 400 in the optical axis (Z-axis) direction, and may rotate relative to the base 400. As the rotor 300 rotates, the size of an incidence hole 210 of the aperture module 2 may be changed.

The plurality of blades 200 may form the incidence hole 210. A portion of the blades may be disposed to overlap a different portion of the blades in the optical axis (Z-axis) direction. For example, one set of a plurality of blades (e.g., three blades) and a different set of a plurality of blades (e.g., three blades) may be sequentially arranged in the optical axis (Z-axis) direction. In this case, a portion of one blade may be disposed to overlap two different blades in the optical axis (Z-axis) direction.

In the present embodiment, although it is illustrated as a structure in which six blades are provided in total, three blades are provided as one set, and two sets of blades are stacked in two layers, but the number of blades 200 is limited thereto.

The incidence hole 210 may be defined by the surfaces of the blades facing an optical axis (Z-axis). The positions of the blades may be changed by the aperture driver 500. Therefore, the size of the incidence hole 210 may be changed, depending on the positions of the blades.

For example, as illustrated in FIGS. 3 and 4, a size of an incidence hole 210 may decrease or increase, as the blades rotate.

The plurality of blades 200 may be coupled to the base 400 and the rotor 300.

Each of the blades may include a through-hole 220. For example, each of the blades may have a through-hole 220 in an outward end portion, and the through-hole 220 may have a shape passing through each of the blades in the optical axis (Z-axis) direction.

The through-hole 220 of each of the blades may be coupled to the base 400. For example, a plurality of protruded portions 410 protruding in the optical axis (Z-axis) direction may be disposed on the base 400, and each of the protruded portions 410 may be coupled to the through-hole 220 of each of the blades. Each of the protruded portions 410 may form a rotation axis of each of the blades. The size of each of the protruded portions 410 may correspond to the size of each of the through-holes 220.

Additionally, each of the blades may include a guide hole 230. For example, each of the blades may have a guide hole 230 spaced apart from the through-hole 220.

The guide hole 230 of each of the blades may be coupled to the rotor 300. For example, a plurality of guide protrusions 310 protruding in the optical axis (Z-axis) direction may be disposed on the rotor 300, and each of the guide protrusions 310 may be coupled to the guide hole 230 of each of the blades. The size of the guide hole 230 may be larger than the size of each of the guide protrusions 310. For example, the width of the guide hole 230 may correspond to the diameter of the guide protrusion 310, and the length of the guide hole 230 may be greater than the diameter of the guide protrusion 310.

The shape of the guide hole 230 is not limited thereto. For example, when the positions of the blades are allowed to move to interlock with the movement of the rotor 300, the shape of the guide hole 230 may be changed.

Therefore, as the rotor 300 rotates, each of the guide protrusions 310 may move in the guide hole 230, and accordingly, each of the blades may rotate about the protruded portion 410 of the base 400 as a rotation axis.

The aperture module 2 according to an embodiment of the present disclosure may further include a cover 100. The cover 100 may be coupled to base 400. The plurality of blades 200 and the rotor 300 may be disposed in a space between the cover 100 and the base 400.

A first spacer 110 may be disposed between the plurality of blades 200 and the cover 100. For example, a first spacer 110 may be coupled to the rotor 300, and may be disposed between the plurality of blades 200 and the cover 100. The first spacer 110 may cover at least a portion of the upper surfaces of the plurality of blades 200. A surface of the first spacer 110 may be coated in black.

The first spacer 110 may have a through-hole 220 through which light passes, and the size of the through-hole 220 of the first spacer 110 may be larger than the maximum size of the incidence hole 210 formed by the plurality of blades 200.

A second spacer 120 may be disposed between the rotor 300 and the plurality of blades 200. For example, a second spacer 120 may be coupled to the rotor 300, and may be disposed between the rotor 300 and the plurality of blades 200. The second spacer 120 may cover at least a portion of the lower surfaces of the plurality of blades 200. A surface of the second spacer 120 may be coated in black.

The second spacer 120 may have a through-hole 220 through which light passes, and the size of the through-hole 220 of the second spacer 120 may be larger than the maximum size of the incidence hole 210 formed by the plurality of blades 200. Also, the size of the through-hole 220 of the second spacer 120 may be smaller than the size of the through-hole 220 of the first spacer 110.

The aperture driver 500 may move the rotor 300 to change the size of the incidence hole 210. For example, the aperture driver 500 may generate driving force to rotate the rotor 300.

As the rotor 300 rotates, the guide protrusion 310 of the rotor 300 may move in the guide hole 230 of the plurality of blades 200, and accordingly, the plurality of blades 200 may rotate about the protruded portion 410 of the base 400 as a rotation axis, to change the size of the incidence hole 210.

The aperture driver 500 may include a magnet portion 510 and a coil portion 520. The magnet portion 510 and the coil portion 520 may be arranged to face each other in the optical axis (Z-axis) direction.

The magnet portion 510 may be disposed on one of the rotor 300 or the base 400, and the coil portion 520 may be disposed on the other one thereof.

For example, the magnet portion 510 may be mounted on the rotor 300. As an example, the magnet portion 510 may be mounted on a lower surface of the rotor 300.

The magnet portion 510 may include a plurality of aperture magnets spaced apart from each other. As an example, the magnet portion 510 may include a first aperture magnet 511 and a second aperture magnet 512, disposed on opposite sides, based on the optical axis (Z-axis).

The first and second aperture magnets 511 and 512 may be magnetized, respectively, such that one surface (e.g., a surface facing the coil portion 520) has both an N pole and an S pole. As an example, one surface of the first and second aperture magnets 511 and 512, facing the coil portion 520, may be provided with an N pole, a neutral region, and an S pole in sequence in a direction, perpendicular to the optical axis (Z-axis).

The coil portion 520 may be disposed to face the magnet portion 510. For example, the coil portion 520 may be disposed to face the magnet portion 510 in the optical axis (Z-axis) direction.

The coil portion 520 may be disposed on an aperture substrate 540, and the aperture substrate 540 may be mounted on the base 400 such that the magnet portion 510 and the coil portion 520 face each other in the optical axis (Z-axis) direction. As an example, the coil portion 520 may be disposed on one surface of the aperture substrate 540. The aperture substrate 540 may be mounted on an upper surface of the base 400.

The coil portion 520 may include a plurality of aperture coils. As an example, the coil portion 520 may include a first aperture coil 521 and a second aperture coil 522, disposed on opposite sides, based on the optical axis (Z-axis).

The magnet portion 510 may be a moving member that is mounted on the rotor 300 and rotates together with the rotor 300, and the coil portion 520 may be a fixed member fixed to the base 400.

In another embodiment, it is also possible to arrange the magnet portion 510 and the coil portion 520 opposite to each other. In this case, since the coil portion 520 and the aperture substrate 540 are mounted on the rotor 300 and rotate together with the rotor 300, at least a portion of the aperture substrate 540 may be configured to be flexible.

When power is applied to the coil portion 520, the rotor 300 may rotate by electromagnetic force between the magnet portion 510 and the coil portion 520.

In the present embodiment, the rotor 300 may rotate by rotation of the aperture driver 500 (for example, the magnet portion 510).

When a magnet linearly moves and the linear movement of the magnet is changed to a rotational movement of a rotor, there may be problems in that the rotor rotates by an external force when power is not applied and the size of an incidence hole is changed.

In the present embodiment, since the center of gravity of a driving body (magnet portion 510) may be located in a rotation radius of the rotor 300, the rotor may not rotate even when an external force is applied.

A rolling portion RB may be disposed between the base 400 and the rotor 300. For example, a rolling portion RB may be disposed between the base 400 and the rotor 300 to reduce friction when the rotor 300 rotates.

The rolling portion RB may include a plurality of rolling balls spaced apart in a circumferential direction of the rotor 300. When the rotor 300 rotates, the plurality of rolling balls may roll in a rotation direction of the rotor 300. The rolling portion RB may include three or more rolling balls. In the present embodiment, the rolling portion RB is illustrated as including four rolling balls, but the number of rolling balls may not be limited as long as there are three or more rolling balls.

A pulling yoke portion 550 may be disposed on the base 400. The pulling yoke portion 550 may be disposed to face the magnet portion 510 in the optical axis (Z-axis) direction.

The pulling yoke portion 550 may be integrally coupled to the base 400 by insert injection. In this case, the pulling yoke portion 550 may be manufactured to be integrated with the base 400 by injecting a resin material into a mold while the pulling yoke portion 550 is fixed in the mold.

The pulling yoke portion 550 and the magnet portion 510 may generate attractive force therebetween. For example, the pulling yoke portion 550 may be a magnetic material. The attractive force may act in the optical axis (Z-axis) direction between the magnet portion 510 and the pulling yoke portion 550.

The rolling portion RB may be in contact with the base 400 and the rotor 300, respectively, due to the attractive force of the magnet portion 510 and the pulling yoke portion 550.

The pulling yoke portion 550 may include a first pulling yoke 551 and a second pulling yoke 552. The first pulling yoke 551 may face the first aperture magnet 511 in the optical axis (Z-axis) direction, and the second pulling yoke 552 may face the second aperture magnet 512 in the optical axis (Z-axis) direction.

Figure 7:
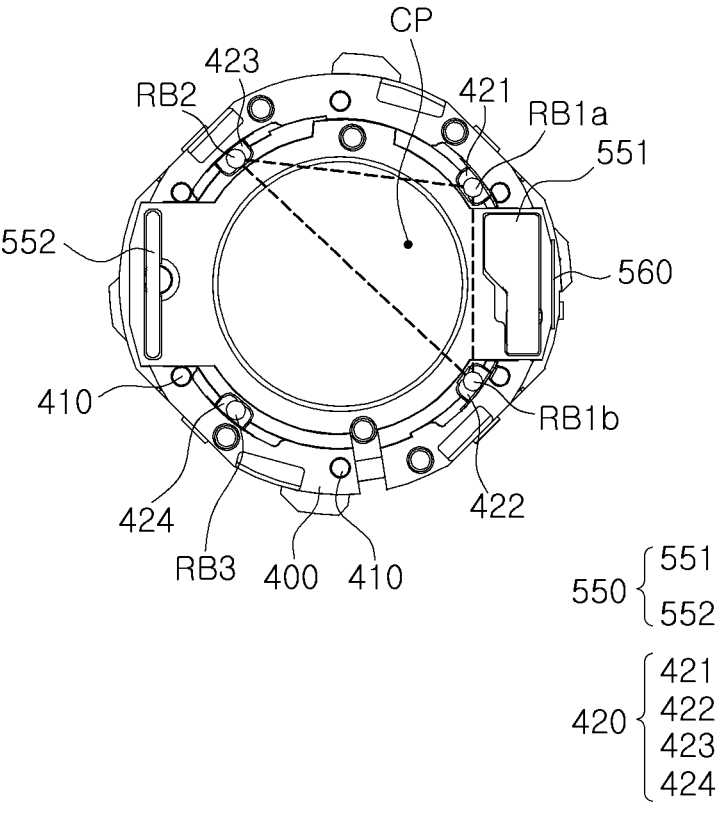
FIG. 7 is a plan view illustrating a configuration in which a rolling portion is disposed on a base.
Figure 8:
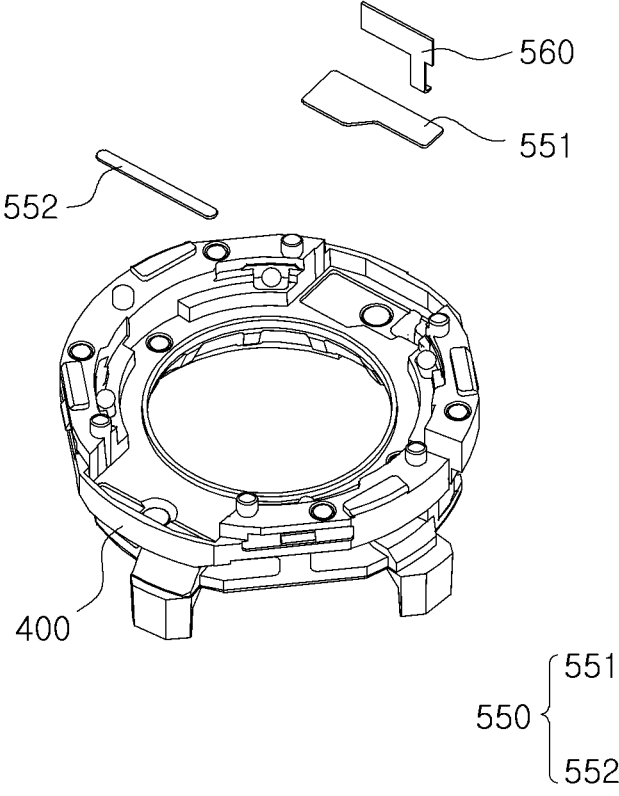
FIG. 8 is a perspective view illustrating a configuration in which a pulling yoke portion and an auxiliary yoke are separated from a base.
Figure 9:
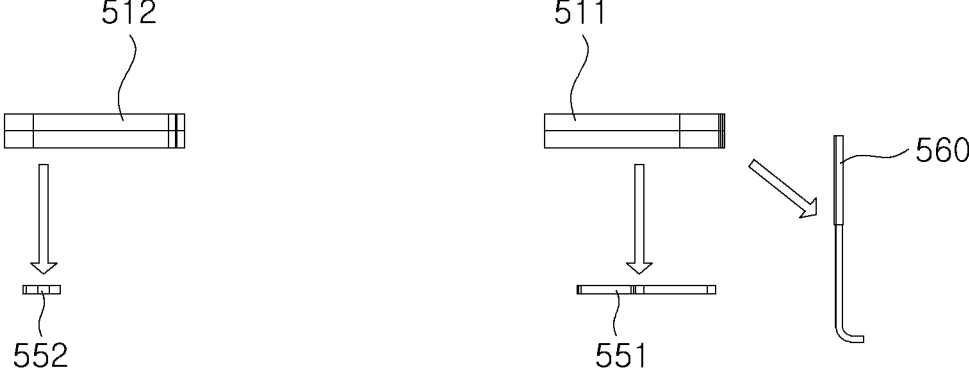
FIG. 9 is a side view schematically illustrating a configuration in which a magnet portion, a pulling yoke portion, and an auxiliary yoke are arranged.

FIG. 7 is a plan view illustrating a configuration in which a rolling portion is disposed on a base, FIG. 8 is a perspective view illustrating a configuration in which a pulling yoke portion and an auxiliary yoke are separated from a base, and FIG. 9 is a side view schematically illustrating a configuration in which a magnet portion, a pulling yoke portion, and an auxiliary yoke are arranged.

Additionally, FIG. 10 is a schematic cross-sectional view of an aperture module illustrating the arrangement of the first and second rolling members.

Referring to FIG. 7, a rolling portion RB may include a first rolling member RB1 and a second rolling member RB2, and may further include a third rolling member RB3. The first to third rolling members RB1, RB2, and RB3 may be arranged to be spaced apart in a circumferential direction of a base 400.

The number of rolling balls included in the first rolling member RB1 may be greater than the number of rolling balls included in the second rolling member RB2. Additionally, the number of rolling balls included in the first rolling member RB1 may be greater than the number of rolling balls included in the third rolling member RB3.

The first rolling member RB1 may include at least two rolling balls spaced apart in the circumferential direction of the base 400. For example, the first rolling member RB1 may include a first rolling ball RB1a and a second rolling ball RB1b. The second rolling member RB2 may include one rolling ball (e.g., a third rolling ball), and the third rolling member RB3 may include at least one rolling ball (e.g., a fourth rolling ball).

The first rolling member RB1 may be disposed closer to a first aperture magnet 511, as compared to a second aperture magnet 512. The second rolling member RB2 may be disposed closer to the second aperture magnet 512, as compared to the first aperture magnet 511. A relative position of the third rolling member RB3 with respect to the magnet portion 510 is not particularly limited.

A guide groove portion may be disposed in a surface on which the base 400 and a rotor 300 face each other. For example, a first guide groove portion 420 may be disposed in the base 400, and a second guide groove portion 320 may be disposed in the rotor 300.

The rolling portion RB may be disposed between the first guide groove portion 420 and the second guide groove portion 320.

The first guide groove portion 420 may include a 1-1 guide groove 421, a 1-2 guide groove 422, a 1-3 guide groove 423, and a 1-4 guide groove 424. The 1-1 guide groove 421 to the 1-4 guide groove 424 may be arranged to be spaced apart in the circumferential direction of the base 400.

The 1-1 guide groove 421 to the 1-4 guide groove 424 may include a bottom surface formed on one surface (e.g., an upper surface) of the base 400, and a side surface extending in the optical axis (Z-axis) direction from the bottom surface, respectively.

The second guide groove portion 320 may include a 2-1 guide groove 321, a 2-2 guide groove 322, a 2-3 guide groove 323, and a 2-4 guide groove 324. The 2-1 guide groove 321 to the 2-4 guide groove 324 may be arranged to be spaced apart in a circumferential direction of the rotor 300.

The 2-1 guide groove 321 to the 2-4 guide groove 324 may include a bottom surface formed on one surface (e.g., a lower surface) of the rotor 300, and a side surface extending in the optical axis (Z-axis) direction from the bottom surface, respectively.

The 1-1 guide groove 421 and the 2-1 guide groove 321 may be arranged to face each other, and one (for example, the first rolling ball RB1a) of the two rolling balls of the first rolling member RB1 may be disposed in a space between the 1-1 guide groove 421 and the 2-1 guide groove 321.

The bottom surface of the 1-1 guide groove 421 and the bottom surface of the 2-1 guide groove 321 may face each other in the optical axis (Z-axis) direction, and the side surface of the 1-1 guide groove 421 and the side surface of the 2-1 guide groove 321 may face each other in a direction, perpendicular to an optical axis (Z-axis).

In addition, the 1-2 guide groove 422 and the 2-2 guide groove 322 may be arranged to face each other, and a remaining one (e.g., the second rolling ball RB1b) of the two rolling balls of the first rolling member RB1 may be disposed in a space between the 1-2 guide groove 422 and the 2-2 guide groove 322.

The bottom surface of the 1-2 guide groove 422 and the bottom surface of the 2-2 guide groove 322 may face each other in the optical axis (Z-axis) direction, and the side surface of the 1-2 guide groove 422 and the side surface of the 2-2 guide groove 322 may face each other in a direction, perpendicular to the optical axis (Z-axis).

The first rolling ball RB1a of the first rolling member RB1 may be in contact with the 1-1 guide groove 421 and the 2-1 guide groove 321 at two points, respectively.

For example, the first rolling ball RB1a may be in contact with the 1-1 guide groove 421 at two points, and may be in contact with the 2-1 guide groove 321 at two points.

The second rolling ball RB1b of the first rolling member RB1 may be in contact with the 1-2 guide groove 422 and the 2-2 guide groove 322 at two points, respectively.

For example, the second rolling ball RB1*b* may be in contact with the 1-2 guide groove 422 at two points, and may be in contact with the 2-2 guide groove 322 at two points.

The first rolling member RB1, the 1-1 guide groove 421, the 1-2 guide groove 422, the 2-1 guide groove 321, and the 2-2 guide groove 322 may function as a main guide guiding rotation of the rotor 300.

The 1-3 guide groove 423 and the 2-3 guide groove 323 may be arranged to face each other, and the second rolling member RB2 may be disposed in a space between the 1-3 guide groove 423 and the 2-3 guide groove 323.

The bottom surface of the 1-3 guide groove 423 and the bottom surface of the 2-3 guide groove 323 may face each other in the optical axis (Z-axis) direction, and the side surface of the 1-3 guide groove 423 and the side surface of the 2-3 guide groove 323 may face each other in a direction, perpendicular to the optical axis (Z-axis).

The second rolling member RB2 may be in contact with the 1-3 guide groove 423 and the 2-3 guide groove 323. The number of contact points between the second rolling member RB2 and the 1-3 guide groove 423 and the 2-3 guide groove 323 may be two or three.

For example, when the number of contact points between the second rolling member RB2 and the 1-3 guide groove 423 and the 2-3 guide groove 323 is two, the second rolling member RB2 may be in contact with the bottom surface of the 1-3 guide groove 423 and the bottom surface of the 2-3 guide groove 323.

When the number of contact points between the second rolling member RB2 and the 1-3 guide groove 423 and the 2-3 guide groove 323 is three, the second rolling member RB2 may be in contact with the bottom surface of the 1-3 guide groove 423 and the bottom surface of the 2-3 guide groove 323, and may be in contact with one of the side surface of the 1-3 guide groove 423 or the side surface of the 2-3 guide groove 323.

A distance between a surface of the 1-3 guide groove 423 and a surface of the 2-3 guide groove 323 (for example, the side surface of the 1-3 guide groove 423 and the side surface of the 2-3 guide groove 323), facing in a direction, perpendicular to the optical axis (Z-axis) direction, may be greater than a diameter of the second rolling member RB2.

The second rolling member RB2, the 1-3 guide groove 423, and the 2-3 guide groove 323 may function as an auxiliary guide supporting the rotation of the rotor 300.

When viewed from the optical axis (Z-axis) direction, rotor 300 may be supported at three points with respect to the base 400 by the first rolling member RB1 and the second rolling member RB2.

The 1-4 guide groove 424 and the 2-4 guide groove 324 may be arranged to face each other, and the third rolling member RB3 may be disposed in a space between the 1-4 guide groove 424 and the 2-4 guide groove 324.

The bottom surface of the 1-4 guide groove 424 and the bottom surface of the 2-4 guide groove 324 may face each other in the optical axis (Z-axis) direction, and the side surface of the 1-4 guide groove 424 and the side surface of the 2-4 guide groove 324 may face each other in a direction, perpendicular to the optical axis (Z-axis).

The third rolling member RB3 may be in contact with at least one of the 1-4 guide groove 424 or the 2-4 guide groove 324. The number of contact points between the third rolling member RB3, the 1-4 guide groove 424, and the 2-4 guide groove 324 may be one or two. For example, when the number of contact points between the third rolling member RB3 and the 1-4 guide groove 424 and the 2-4 guide groove 324 is one, the third rolling member RB3 may be in contact with the bottom surface of the 1-4 guide groove 424 or the bottom surface of the 2-4 guide groove 324.

When the number of contact points between the third rolling member RB3 and the 1-4 guide groove 424 and the 2-4 guide groove 324 is two, the third rolling member RB3 may be in contact with one of the bottom surface of the 1-4 guide groove 424 or the bottom surface of the 2-4 guide groove 324 at one point, and may be in contact with one of the side surface of the 1-4 guide groove 424 or the side surface of the 2-4 guide groove 324 at one point.

A distance between the bottom surface of the 1-4 guide groove 424 and the bottom surface of the 2-4 guide groove 324 in the optical axis (Z-axis) direction may be greater than a distance between the bottom surface of the 1-1 guide groove 421 and the bottom surface of the 2-1 guide groove 321 in the optical axis (Z-axis) direction.

The diameter of a rolling ball of the third rolling member RB3 may be smaller than the diameter of a rolling ball of the first rolling member RB1, and the diameter of a rolling ball of the second rolling member RB2, respectively.

The third rolling member RB3 may function to prevent the rotor 300 from tilting with respect to the base 400, when an external shock occurs. For example, by preventing the rotor 300 from tilting with respect to the base 400, when an external shock occurs, the rolling portion RB may be prevented from being separated from the base 400 and the rotor 300.

The third rolling member RB3 may be an optional component, and when the third rolling member RB3 is omitted, the positions of the first rolling member RB1 and the second rolling member RB2 may be adjusted to prevent tilting of the rotor 300.

When viewed from the optical axis (Z-axis) direction, the rotor 300 may be supported at three points with respect to the base 400 by the first rolling member RB1 and the second rolling member RB2.

In this case, to stably rotate the rotor 300, a center point CP of attractive force acting between the magnet portion 510 and the pulling yoke portion 550 needs to be located within a support region connecting the contact points of the first rolling member RB1 and the base 400 (or rotor 300) and the contact points of the second rolling member RB2 and the base 400 (or rotor 300).

In addition, since the support region becomes wider toward to the first rolling member RB1, it may be desirable to arrange the center point CP of the attractive force closer to the first rolling member RB1.

To this end, the first pulling yoke 551 and the second pulling yoke 552 may be configured to have different sizes such that the center point CP of the attractive force may be located closer to the first rolling member RB1. An area of the first pulling yoke 551 facing the first aperture magnet 511 may be larger than the area of the second pulling yoke 552 facing the second aperture magnet 512.

For example, by configuring the size of the first pulling yoke 551 to be larger than the size of the second pulling yoke 552, the center point CP of the attractive force may be located closer to the first rolling member RB1.

As another example, it is possible to configure the size of the first aperture magnet 511 to be larger than the size of the second aperture magnet 512 to locate the center point CP of the attractive force closer to the first rolling member RB1.

As another example, by configuring a distance between the first aperture magnet 511 and the first pulling yoke 551 in the optical axis (Z-axis) direction to be narrower than the distance between the second aperture magnet 512 and the second pulling yoke 552 in the optical axis (Z-axis) direction, the center point CP of the attractive force may be also located closer to the first rolling member RB1.

The first pulling yoke 551 may have an asymmetric shape with respect to the center of the first pulling yoke 551. For example, based on a virtual line passing through the optical axis (Z-axis) and crossing the center of the first pulling yoke 551, an area of one side may be larger than an area of the other side.

As another example, the first pulling yoke 551 may be provided as two yokes arranged adjacent to each other. In this case, the size of one yoke may be larger than the size of the other yoke.

Referring to FIG. 8, an aperture module 2 according to an embodiment of the present disclosure may further include an auxiliary yoke 560.

The auxiliary yoke 560 may be disposed closer to a first aperture magnet 511, as compared to a second aperture magnet 512.

The auxiliary yoke 560 may be disposed on an internal side surface, among surfaces of a base 400, extending in the optical axis (Z-axis) direction. For example, at least a portion of the auxiliary yoke 560 may be disposed to face the first aperture magnet 511 in a direction, perpendicular to the optical axis (Z-axis). The auxiliary yoke 560 may be a magnetic material.

The auxiliary yoke 560 may be integrally coupled to the base 400. In an example, the auxiliary yoke 560 is integrally coupled to the base 400 by insert injection. In this case, the auxiliary yoke 560 may be manufactured to be integrated with the base 400 by injecting resin material into a mold while the auxiliary yoke 560 is fixed in the mold.

The position of an upper end of the auxiliary yoke 560 in the optical axis (Z-axis) direction may be between the upper and lower surfaces of the first aperture magnet 511.

Attractive force may act in the optical axis (Z-axis) direction by the first aperture magnet 511 and a first pulling yoke 551, and attractive force may act in a direction, intersecting an optical axis (Z-axis) (for example, in a direction, perpendicular to the optical axis (Z-axis), or in a direction, inclined downwardly and intersecting the optical axis (Z-axis)) by the first aperture magnet 511 and the auxiliary yoke 560.

For example, attractive force may act on the first aperture magnet 511 in at least two directions intersecting each other.

By the attractive force acting between the first aperture magnet 511 and the first pulling yoke 551, a rotor 300 on which the first aperture magnet 511 is mounted may be pulled toward the base 400 on which the first pulling yoke 551 is mounted, in the optical axis (Z-axis) direction.

Therefore, due to the attractive force acting between the first aperture magnet 511 and the first pulling yoke 551, a first rolling ball RB1*a* may be in contact with a bottom surface of a 1-1 guide groove 421 and a bottom surface of a 2-1 guide groove 321.

In addition, due to the attractive force acting between the first aperture magnet 511 and the first pulling yoke 551, a second rolling ball RB1*b* may be in contact with a bottom surface of a 1-2 guide groove 422, and a bottom surface of a 2-2 guide groove 322.

Due to the attractive force acting between the first aperture magnet 511 and the auxiliary yoke 560, the rotor 300 on which the first aperture magnet 511 is mounted may be pulled toward the base 400 on which the auxiliary yoke 560 is mounted, in a direction, intersecting the optical axis (Z-axis).

Therefore, due to the attractive force acting between the first aperture magnet 511 and the auxiliary yoke 560, the first rolling ball RB1*a* may be in contact with a side surface of the 1-1 guide groove 421 and a side surface of the 2-1 guide groove 321.

In addition, due to the attractive force acting between the first aperture magnet 511 and the auxiliary yoke 560, the second rolling ball RB1*b* may be in contact with a side surface of the 1-2 guide groove 422 and a side surface of the 2-2 guide groove 322.

The side surface of the 1-1 guide groove 421, the side surface of the 1-2 guide groove 422, the side surface of the 2-1 guide groove 321, and the side surface of the 2-2 guide groove 322 may be curved. For example, a radius of curvature of the side surface of the 1-1 guide groove 421, a radius of curvature of the side surface of the 1-2 guide groove 422, a radius of curvature of the side surface of the 2-1 guide groove 321, and a radius of curvature of the side surface of the 2-2 guide groove 322 may be the same.

In addition, a virtual circle passing through the side surface of the 1-1 guide groove 421 and the side surface of the 1-2 guide groove 422, and a virtual circle passing through the side surface of the 2-1 guide groove 321 and the side surface of the 2-2 guide groove may be concentric.

When a driving force is generated by an aperture driver 500, the first rolling ball RB1*a* may roll along the side surface of the 1-1 guide groove 421 and the side surface of the 2-1 guide groove 321, and the second rolling ball RB1*b* may roll along the side surface of the 1-2 guide groove 422 and the side surface of the 2-2 guide groove 322.

Therefore, the rotor 300 may be guided and rotated by the first rolling ball RB1*a* and the second rolling ball RB1*b*.

When the rotor 300 rotates, the second rolling member RB2 may remain in contact with the bottom surface of a 1-3 guide groove 423 and the bottom surface of a 2-3 guide groove 323, the rotor 300, and may maintain a three-point support form with respect to the rolling portion RB.

In an embodiment, the aperture module 2 may sense the position of the rotor 300.

To this end, an aperture position sensor 530 may be provided. The aperture position sensor 530 may be disposed on an aperture substrate 540 to face the magnet portion 510. For example, the aperture position sensor 530 may face at least one of the first aperture magnet 511 or the second aperture magnet 512 in the optical axis (Z-axis) direction.

The aperture position sensor 530 may be a Hall sensor.

FIG. 11 is an exploded perspective view of a camera actuator according to an embodiment, and FIG. 12 is a top view of a connection substrate of a camera actuator.

Referring to FIG. 11, a camera actuator 3 according to an embodiment of the present disclosure may include a lens module 2000 and a housing 1100 accommodating the lens module 2000.

Additionally, the camera actuator 3 may further include a guide frame 3000, a carrier 4000, a case 1300, and an image sensor module.

In the following embodiment, an example in which a base 400 of an aperture module 2 is coupled to the lens module 2000 of the camera actuator 3 will be described. In this case, the aperture module 2 may move together with the lens module 2000, as the lens module 2000 moves.

The carrier 4000 may be disposed in the housing 1100, and may move relative to the housing 1100 in the optical axis (Z-axis) direction.

The lens module 2000 may be disposed on the carrier 4000, and the carrier 4000 and lens module 2000 may move together in the optical axis (Z-axis) direction. Therefore, the distance between the lens module 2000 and an image sensor may be changed to adjust the focus.

Additionally, the guide frame 3000 may be disposed between the carrier 4000 and the lens module 2000. The guide frame 3000 may function to guide the lens module 2000 to move in a direction, perpendicular to an optical axis (Z-axis).

The lens module 2000 may move in a direction, perpendicular to the optical axis (Z-axis), to correct shaking during capturing.

The lens module 2000 may include a lens barrel 2100 and a lens holder 2200. The lens barrel 2100 may have a hollow cylindrical shape, and at least one lens for imaging a subject may be accommodated inside the lens barrel 2100. When a plurality of lenses are disposed, the plurality of lenses may be mounted inside the lens barrel 2100 along the optical axis (Z-axis).

The lens barrel 2100 may be coupled to the lens holder 2200. Therefore, the lens barrel 2100 and the lens holder 2200 may move together.

The base 400 of the aperture module 2 may be coupled to the lens holder 2200.

The lens module 2000 may be accommodated in the housing 1100. For example, the housing 1100 may have an upper portion and a lower portion, which are open in upward and downward directions, respectively, the carrier 4000 may be disposed in an internal space of the housing 1100, and the lens module 2000 may be accommodated in the carrier 4000.

The camera actuator 3 may move the lens module 2000 in the optical axis (Z-axis) direction to adjust a focus, and may move the lens module 2000 in a direction, perpendicular to the optical axis (Z-axis), to correct shaking during capturing.

The camera actuator 3 may include a focus driver 5000 moving the lens module 2000 in the optical axis (Z-axis) direction, and a shaking driver 6000 moving the lens module 2000 in a direction, perpendicular to the optical axis (Z-axis).

The image sensor module may be a device that converts light incident through the lens module 2000 into an electrical signal.

For example, the image sensor module may include an image sensor and a printed circuit board connected to the image sensor, and may further include an infrared filter.

The infrared filter may serve to block light in an infrared region, among light incident through the lens module 2000.

The image sensor may convert light incident through the lens module 2000 into an electrical signal. For example, the image sensor may be a charge coupled device (CCD) or a complementary metal-oxide semiconductor (CMOS).

The electrical signal converted by the image sensor may be output as an image through a display unit of a portable electronic device.

The image sensor may be fixed to the printed circuit board, and may be electrically connected to the printed circuit board by wire bonding.

The image sensor module may be disposed in a lower portion of the housing 1100.

The case 1300 may be coupled to the housing 1100 to surround an external surface of the housing 1100, and may function to protect an internal component of the camera actuator 3.

The focus driver 5000 may move the lens module 2000 to focus on the subject. For example, the focus driver 5000 may generate a driving force in the optical axis (Z-axis) direction to move the carrier 4000. Since the lens module 2000 may be disposed in the carrier 4000, the carrier 4000 and the lens module 2000 may move together in the optical axis (Z-axis) direction by the driving force of the focus driver 5000.

Additionally, since the base 400 of the aperture module 2 may be coupled to the lens module 2000, the aperture module 2 may also move in the optical axis (Z-axis) direction, together with the lens module 2000.

The focus driver 5000 may include a first magnet 5100 and a first coil 5300. The first magnet 5100 and the first coil 5300 may be arranged to face each other in a direction, perpendicular to the optical axis (Z-axis).

The first magnet 5100 may be mounted on the carrier 4000. As an example, the first magnet 5100 may be mounted on one side surface of the carrier 4000.

The first magnet 5100 may be magnetized such that one surface (e.g., a surface facing the first coil 5300) has both an N pole and an S pole. For example, one surface of the first magnet 5100 facing the first coil 5300 may be provided with an N pole, a neutral region, and an S pole in sequence in the optical axis (Z-axis) direction.

The first coil 5300 may be disposed to face the first magnet 5100. For example, the first coil 5300 may be disposed to face the first magnet 5100 in a direction, perpendicular to the optical axis (Z-axis).

The first coil 5300 may be disposed on a substrate 7000, and the substrate may be mounted in the housing 1100 such that the first magnet 5100 and the first coil 5300 face each other in a direction, perpendicular to the optical axis (Z-axis). As an example, the first coil 5300 may be disposed on one surface of the substrate 7000. The substrate 7000 may be mounted on one surface of the housing 1100 such that the first magnet 5100 and the first coil 5300 face each other in a direction, perpendicular to the optical axis (Z-axis).

The housing 1100 may be provided with an opening, and the first coil 5300 disposed on the substrate 7000 may directly face the first magnet 5100 through the opening.

The first magnet 5100 may be a moving member mounted on the carrier 4000 and moving in the optical axis (Z-axis) direction together with the carrier 4000, and the first coil 5300 may be a fixed member fixed to the substrate 7000.

When power is applied to the first coil 5300, the carrier 4000 may move in the optical axis (Z-axis) direction by an electromagnetic force between the first magnet 5100 and the first coil 5300.

Since the lens module 2000 is accommodated in the carrier 4000, the lens module 2000 may also move in the optical axis (Z-axis) direction by movement of the carrier 4000. Additionally, the aperture module 2 may also move in the optical axis (Z-axis) direction, together with the lens module 2000.

A first ball member B1 may be disposed between the carrier 4000 and the housing 1100. For example, the first ball member B1 may be disposed between the carrier 4000 and the housing 1100 to reduce friction, when the carrier 4000 moves.

The first ball member B1 may include a plurality of balls arranged in the optical axis (Z-axis) direction. The plurality of balls may roll in the optical axis (Z-axis) direction, when the carrier 4000 moves in the optical axis (Z-axis) direction.

A first yoke may be disposed in the housing 1100. The first yoke may be disposed to face the first magnet 5100. For example, the first coil 5300 may be disposed on one surface of the substrate 7000, and a first yoke 5700 may be disposed on the other surface of the substrate 7000.

The first magnet 5100 and the first yoke 5700 may generate attractive force therebetween. For example, the first yoke 5700 may be formed of a magnetic material. Attractive force may act between the first magnet 5100 and the first yoke 5700 in a direction, perpendicular to the optical axis (Z-axis).

The first ball member B1 may be in contact with the carrier 4000 and the housing 1100, respectively, due to the attractive force of the first magnet 5100 and the first yoke 5700.

A receiving groove may be disposed on a surface on which the carrier 4000 and the housing 1100 face each other. For example, the carrier 4000 may be provided with a first receiving groove, and the housing 1100 may be provided with a second receiving groove.

The first receiving groove and the second receiving groove may extend in the optical axis (Z-axis) direction, respectively. The first ball member B1 may be disposed between the first receiving groove and the second receiving groove.

The first ball member B1 may include a first ball group BG1 and a second ball group BG2, and the first ball group BG1 and the second ball group BG2 may include a plurality of balls arranged in the optical axis (Z-axis) direction.

The first ball group BG1 and the second ball group BG2 may be arranged to be spaced apart in a direction, perpendicular to the optical axis (Z-axis), (e.g., X-axis direction). The number of balls in the first ball group BG1 may be different from the number of balls in the second ball group BG2.

For example, the first ball group BG1 may include three or more balls arranged in the optical axis (Z-axis) direction, and the second ball group BG2 may include fewer balls, as compared to balls included in the first ball group BG1.

Under the premise that the number of balls in the first ball group BG1 and the number of balls in the second ball group BG2 are different, the number of balls in each ball member may be changed. Hereinafter, for convenience of explanation, the description will be based on an embodiment in which the first ball group BG1 includes three balls and the second ball group BG2 includes two balls.

Among the three balls included in the first ball group BG1, two balls disposed in an outermost side portion in a direction, parallel to the optical axis (Z-axis), may have the same diameter, and a diameter of one ball disposed therebetween may be smaller than a diameter of each of the balls disposed in the outermost side portion.

The two balls included in the second ball group BG2 may have the same diameter.

In an embodiment, the camera actuator 3 may sense the position of the carrier 4000 in the optical axis (Z-axis) direction.

For this purpose, a first position sensor 5500 may be provided. The first position sensor 5500 may be disposed on the substrate 7000 to face the first magnet 5100. The first position sensor 5500 may be a Hall sensor.

The camera actuator 3 may move the lens module 2000 in a direction, perpendicular to the optical axis (Z-axis), to correct shaking during capturing. To this end, the camera actuator 3 may include the shaking driver 6000 moving the lens module 2000 in a direction, perpendicular to the optical axis (Z-axis).

The guide frame 3000 and the lens module 2000 may be sequentially accommodated in the carrier 4000. For example, the guide frame 3000 may be disposed between the carrier 4000 and the lens module 2000. The guide frame 3000 may have a hollow square plate shape.

By a driving force of the shaking driver 6000, the guide frame 3000 and the lens module 2000 may move together in one direction, perpendicular to the optical axis (Z-axis), and the lens module 2000 may relatively move with respect to the guide frame 3000 in a different direction, perpendicular to the optical axis (Z-axis).

For example, the guide frame 3000 and the lens module 2000 may move together in a first axis (X-axis) direction, perpendicular to the optical axis (Z-axis), and the lens module 2000 may relatively move with respect to the guide frame 3000 in a second axis (Y-axis) direction, perpendicular to both the optical axis (Z-axis) and the first axis (X-axis).

In addition, since the base 400 of the aperture module 2 may be coupled to the lens module 2000, the aperture module 2 may also move in the first axis (X-axis) direction and the second axis (Y-axis) direction, together with the lens module 2000.

The shaking driver 6000 may include a first sub-driver 6100 and a second sub-driver 6300. The first sub-driver 6100 may generate a driving force in the first axis (X-axis) direction, and the second sub-driver 6300 may generate a driving force in the second axis (Y-axis) direction.

The first sub-driver 6100 may include a second magnet 6110 and a second coil 6130. The second magnet 6110 and the second coil 6130 may be arranged to face each other in the first axis (X-axis) direction.

The second magnet 6110 may be disposed on the lens module 2000. For example, the second magnet 6110 may be mounted on one side surface of the lens holder 2200.

The second magnet 6110 may be magnetized such that one surface (e.g., a surface facing the second coil 6130) has both an N pole and an S pole. For example, one surface of the second magnet 6110 facing the second coil 6130 may be provided with an N pole, a neutral region, and an S pole in sequence in the second axis (Y-axis) direction. The second magnet 6110 may have a shape having a length in the second axis (Y-axis) direction.

The second coil 6130 may be disposed to face the second magnet 6110. For example, the second coil 6130 may be disposed to face the second magnet 6110 in the first axis (X-axis) direction.

The second coil 6130 may have a hollow donut shape, and may have a length in the second axis (Y-axis) direction. The second coil 6130 may include a plurality of coils. For example, the second coil 6130 may include two coils spaced apart in the second axis (Y-axis) direction, and each of the coils may be disposed to face the second magnet 6110.

During shake correction, the second magnet 6110 may be a moving member mounted on the lens module 2000, and the second coil 6130 may be a fixed member fixed to the housing 1100.

When power is applied to the second coil 6130, the lens module 2000 and the guide frame 3000 may move in the first axis (X-axis) direction by an electromagnetic force between the second magnet 6110 and the second coil 6130.

The second magnet 6110 and the second coil 6130 may generate a driving force in directions facing each other (e.g., in the first axis (X-axis) direction).

The second sub-driver 6300 may include a third magnet 6310 and a third coil 6330. The third magnet 6310 and the third coil 6330 may be arranged to face each other in the second axis (Y-axis) direction.

The third magnet 6310 may be disposed on the lens module 2000. For example, the third magnet 6310 may be mounted on the other side surface of the lens holder 2200.

The third magnet 6310 may be magnetized such that one surface (e.g., a surface facing the third coil 6330) has both an S pole and an N pole. For example, one surface of the third magnet 6310 facing the third coil 6330 may be provided with an S pole, a neutral region, and an N pole in sequence in the first axis (X-axis) direction. The third magnet 6310 may have a shape having a length in the first axis (X-axis) direction.

The third coil 6330 may be disposed to face the third magnet 6310. For example, the third coil 6330 may be disposed to face the third magnet 6310 in the second axis (Y-axis) direction.

The second coil 6130 and the third coil 6330 may be provided on the substrate 7000. For example, the second coil 6130 and the third coil 6330 may be arranged on the substrate 7000 to face the second magnet 6110 and the third magnet 6310, respectively.

The substrate 7000 may be mounted on a side surface of the housing 1100, and the second coil 6130 and the third coil 6330 may directly face the second magnet 6110 and the third magnet 6310, respectively, through the opening provided in the housing 1100.

The third coil 6330 may have a hollow donut shape, and may have a length in the first axis (X-axis) direction. The third coil 6330 may include a plurality of coils. For example, the third coil 6330 may include two coils spaced apart in the first axis (X-axis) direction, and each of the coils may be disposed to face the third magnet 6310.

During shake correction, the third magnet 6310 may be a moving member mounted on the lens module 2000, and the third coil 6330 may be a fixed member fixed to the housing 1100.

When power is applied to the third coil 6330, the lens module 2000 may move in the second axis (Y-axis) direction by an electromagnetic force between the third magnet 6310 and the third coil 6330.

The third magnet 6310 and the third coil 6330 may generate a driving force in directions facing each other (e.g., in the second axis (Y-axis) direction).

The second magnet 6110 and the third magnet 6310 may be arranged perpendicular to each other in a plane, perpendicular to the optical axis (Z-axis), and the second coil 6130 and the third coil 6330 may be also arranged perpendicular to each other in a plane, perpendicular to the optical axis (Z-axis).

A camera actuator 3 according to an embodiment of the present disclosure may be provided with a plurality of ball members supporting the guide frame 3000 and the lens module 2000. The plurality of ball members may function to guide the movement of the guide frame 3000 and the movement of the lens module 2000 during shake correction. In addition, the plurality of ball members may also function to maintain distances between the carrier 4000, guide frame 3000, and lens module 2000.

The plurality of ball members may include a second ball member B2 and a third ball member B3.

The second ball member B2 may guide the movement of the guide frame 3000 and movement of the lens module 2000 in the first axis (X-axis) direction, and the third ball member B3 may guide the movement of the lens module 2000 in the second axis (Y-axis) direction.

As an example, the second ball member B2 may roll in the first axis (X-axis) direction, when a driving force in the first axis (X-axis) direction is generated. Therefore, the second ball member B2 may guide the movement of the guide frame 3000 and the movement of the lens module 2000 in the first axis (X-axis) direction.

The third ball member B3 may roll in the second axis (Y-axis) direction, when a driving force in the second axis (Y-axis) direction is generated. Therefore, the third ball member B3 may guide the movement of the lens module 2000 in the second axis (Y-axis) direction.

The second ball member B2 may include a plurality of ball members disposed between the carrier 4000 and the guide frame 3000, and the third ball member B3 may include a plurality of ball members disposed between the guide frame 3000 and the lens module 2000.

For example, the second ball member B2 and the third ball member B3 may include four ball members, respectively.

A third receiving groove 4100 accommodating the second ball member B2 may be formed on at least one of the surfaces on which the carrier 4000 and the guide frame 3000 face each other in the optical axis (Z-axis) direction. The third receiving groove 4100 may include a plurality of grooves corresponding to the plurality of ball members of the second ball member B2.

The second ball member B2 may be accommodated in the third receiving groove 4100, and may be inserted between the carrier 4000 and the guide frame 3000.

Movement of the second ball member B2 in the optical axis (Z-axis) and second axis (Y-axis) directions may be restricted in a state accommodated in the third receiving groove 4100, and the second ball member B2 may only move in the first axis (X-axis) direction. For example, the second ball member B2 may roll only in the first axis (X-axis) direction.

To this end, a planar shape of each of the plurality of grooves of the third receiving groove 4100 may be a rectangle having a length in the first axis (X-axis) direction.

A fourth receiving groove 3100 accommodating the third ball member B3 may be formed on at least one of the surfaces on which the guide frame 3000 and the lens module 2000 (e.g., lens holder 2200) face each other in the optical axis (Z-axis) direction. The fourth receiving groove 3100 may include a plurality of grooves corresponding to the plurality of ball members of the third ball member B3.

The third ball member B3 may be accommodated in the fourth receiving groove 3100, and may be inserted between the guide frame 3000 and the lens module 2000.

Movement of the third ball member B3 in the optical axis (Z-axis) and first axis (X-axis) directions may be restricted in a state accommodated in the fourth receiving groove 3100, and the third ball member B3 may only move in the second axis (Y-axis) direction. For example, the third ball member B3 may roll only in the second axis (Y-axis) direction.

To this end, a planar shape of each of the plurality of grooves of the fourth receiving groove 3100 may be a rectangle having a length in the second axis (Y-axis) direction.

When a driving force is generated in the first axis (X-axis) direction, the guide frame 3000 and the lens module 2000 may move together in the first axis (X-axis) direction. Additionally, the aperture module 2 may also move in the first axis (X-axis) direction, together with the lens module 2000.

In this case, the second ball member B2 may roll along the first axis (X-axis). In this case, the movement of the third ball member B3 may be restricted.

Additionally, when a driving force is generated in the second axis (Y-axis) direction, the lens module 2000 may move relative to the guide frame 3000 in the second axis (Y-axis) direction. In addition, the aperture module 2 may also move in the second axis (Y-axis) direction, together with the lens module 2000.

In this case, the third ball member B3 may roll along the second axis (Y-axis). In this case, the movement of the second ball member B2 may be restricted.

In an embodiment, the camera actuator 3 may sense the position of the lens module 2000 in a direction, perpendicular to the optical axis (Z-axis).

For this purpose, a second position sensor 6150 and a third position sensor 6350 may be provided. The second position sensor 6150 may be disposed on the substrate 7000 to face the second magnet 6110, and the third position sensor 6350 may be disposed on the substrate 7000 to face the third magnet 6310. The second position sensor 6150 and the third position sensor 6350 may be Hall sensors.

At least one of the second position sensor 6150 or the third position sensor 6350 may include two Hall sensors. For example, the third position sensor 6350 may include two Hall sensors arranged to face the third magnet 6310.

It is possible to sense whether the lens module 2000 rotates through two Hall sensors facing the third magnet 6310. Since the third coil 6330 may include two coils facing the third magnet 6310, a rotational force applied to the lens module 2000 may be canceled by controlling the third coil 6330.

Although the rotation of the lens module 2000 may be prevented by configurations of the third and fourth receiving grooves in which the second ball member B2 and the third ball member B3 are disposed, the lens module 2000 may slightly rotate due to the influence of tolerances occurring in a process of manufacturing a device.

A camera actuator 3 according to an embodiment of the present disclosure may determine whether the lens module 2000 may rotate by the third coil 6330 and the third position sensor 6350, and may offset a rotational force accordingly.

In the present disclosure, a second yoke and a third yoke may be provided to maintain the carrier 4000 and the guide frame 3000 in contact with the second ball member B2, and to maintain the guide frame 3000 and the lens module 2000 in contact with the third ball member B3.

The second yoke and the third yoke may be fixed to the carrier 4000, and may be arranged to face the second magnet 6110 and the third magnet 6310 in the optical axis (Z-axis) direction.

Therefore, attractive force may occur between the second yoke and the second magnet 6110 and between the third yoke and the third magnet 6310 in the optical axis (Z-axis) direction, respectively.

Since the lens module 2000 and the guide frame 3000 may be pressurized in a direction toward the second yoke and the third yoke, due to the attractive force between the second yoke and the second magnet 6110, and the attractive force between the third yoke and the third magnet 6310, the guide frame 3000 and the lens module 2000 may maintain contact with the second ball member B2 and the third ball member B3.

The second yoke and the third yoke may be formed of a material that may generate attractive force between the second magnet 6110 and the third magnet 6310. As an example, the second yoke and the third yoke may be magnetic materials.

An OIS stopper 2300 may be coupled to the carrier 4000. The OIS stopper 2300 may be coupled to the carrier 4000 to cover at least a portion of an upper surface of the lens module 2000. For example, the OIS stopper 2300 may cover at least a portion of an upper surface of the lens holder 2200.

The OIS stopper 2300 may prevent the guide frame 3000 and lens module 2000 from being separated from the carrier 4000 due to an external shock or the like.

Additionally, an AF stopper 2400 may be coupled to the housing 1100. The AF stopper 2400 may include a buffering protrusion disposed to face the first ball member B1 in the optical axis (Z-axis) direction.

The AF stopper 2400 may prevent the carrier 4000 and the first ball member B1 from being separated externally due to an external shock or the like.

Referring to FIGS. 11 and 12, the camera actuator 3 may include a connection substrate 8000. The connection substrate 8000 may connect the aperture substrate 540 of the aperture module 2 and the printed circuit board of the image sensor module.

For example, the aperture substrate 540 may receive power through the connection substrate 8000.

The connection substrate 8000 may include a fixed portion 8100, a moving portion 8300, and a connection portion 8500. The connection substrate 8000 may be an RF PCB.

The moving portion 8300 may be disposed inside the fixed portion 8100, and the connection portion 8500 may be disposed between the fixed portion 8100 and the moving portion 8300.

The fixed portion 8100 may be coupled to the case 1300 of the camera actuator 3. For example, the fixed portion 8100 may be mounted on an internal surface of the case 1300. The fixed portion 8100 may be a fixed member fixed to the case 1300. The fixed portion 8100 may be a rigid circuit board (a rigid PCB). In addition, the fixed portion 8100 may have a square frame shape.

A connector substrate extending in the optical axis (Z-axis) direction may be disposed on one side of the fixed portion 8100. The connector substrate may be connected to the printed circuit board of the image sensor module.

The moving portion 8300 may be coupled to the aperture module 2. For example, the moving portion 8300 may be mounted on the base 400 of the aperture module 2. The moving portion 8300 may be a moving member that may move together with the aperture module 2. The moving portion 8300 may be a rigid circuit board (a rigid PCB). In addition, the moving portion 8300 may have a ring shape.

A portion of the moving portion 8300 may be coupled to the aperture substrate 540 of the aperture module 2. For example, a connection pad may be disposed on one side of the moving portion 8300, and the aperture substrate 540 may be coupled to the connection pad of the moving portion 8300.

The connection portion 8500 may be disposed between the moving portion 8300 and the fixed portion 8100, and may connect the moving portion 8300 and the fixed portion 8100. For example, one side of the connection portion 8500 may be connected to the moving portion 8300, and the other side of the connection portion 8500 may be connected to the fixed portion 8100.

The connection portion 8500 may be a flexible printed circuit board (a flexible PCB). When the moving portion 8300 moves, the connection portion 8500 disposed between the moving portion 8300 and the fixed portion 8100 may be bent.

The connection portion 8500 may extend along at least a portion of the periphery of the moving portion 8300. The connection portion 8500 may have a single bridge shape or a multiple bridge shape.

Since the connection portion 8500 may be bent, power may be stably supplied to the aperture module 2 even when the aperture module 2 moves together with the lens module 2000.

Since the aperture module 2 may move together with the lens module 2000, the magnet portion 510 and the coil portion 520, included in the aperture module 2, may also move together with the lens module 2000.

Therefore, even when the lens module 2000 moves, a distance between the magnet portion 510 and the coil portion 520 may be maintained, and thus driving stability of the aperture module 2 may be improved.

An aperture module and a camera module including the same according to an embodiment of the present disclosure may improve robustness against an external shock or the like, to improve driving reliability.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. An aperture module comprising:
a base;
a rotor rotatably disposed with respect to the base;
a plurality of blades interlocked with the rotor configured to rotate to form incidence holes of various sizes;
a rolling portion, including a plurality of rolling balls, disposed between the base and the rotor; and
an aperture driver including a magnet portion disposed on one of the base or the rotor, and a coil portion disposed to face the magnet portion,
wherein the magnet portion comprises a first aperture magnet and a second aperture magnet spaced apart from each other, and
wherein attractive force always acts on either one of the first aperture magnet or the second aperture magnet in at least two directions intersecting each other.

2. The aperture module of claim 1, further comprising:
a first pulling yoke disposed to face the first aperture magnet in an optical axis direction; and
a second pulling yoke disposed to face the second aperture magnet in the optical axis direction,
wherein the magnet portion and the coil portion face each other in the optical axis direction.

3. The aperture module of claim 2, wherein an area of the first pulling yoke facing the first aperture magnet is larger than an area of the second pulling yoke facing the second aperture magnet.

4. The aperture module of claim 3, wherein, based on a virtual line crossing a center of the first pulling yoke, an area of one side of the first pulling yoke is larger than an area of another side of the first pulling yoke.

5. The aperture module of claim 2, further comprising:
an auxiliary yoke disposed adjacent to the first pulling yoke.

6. The aperture module of claim 5, wherein at least a portion of the auxiliary yoke faces the first aperture magnet in a direction perpendicular to the optical axis direction.

7. The aperture module of claim 6, wherein an upper end of the auxiliary yoke is located between upper and lower surfaces of the first aperture magnet.

8. The aperture module of claim 2, wherein the rolling portion comprises a first rolling member including a first rolling ball and a second rolling ball, and a second rolling member including a third rolling ball, and
wherein the first rolling member is disposed closer to the first aperture magnet than to the second rolling member.

9. The aperture module of claim 8, wherein the base comprises a 1-1 guide groove, a 1-2 guide groove, and a 1-3 guide groove,
the rotor comprises a 2-1 guide groove, a 2-2 guide groove, and a 2-3 guide groove,
the first rolling ball is disposed to contact the 1-1 guide groove and the 2-1 guide groove, facing each other,
the second rolling ball is disposed to contact the 1-2 guide groove and the 2-2 guide groove, facing each other,
the third rolling ball is disposed to contact the 1-3 guide groove and the 2-3 guide groove, facing each other, and
a number of contact points of the third rolling ball is smaller than a number of contact points of the first rolling ball and a number of contact points of the second rolling ball.

10. The aperture module of claim 9, wherein a distance between a surface of the 1-3 guide groove and a surface of the 2-3 guide groove, facing in a direction, perpendicular to the optical axis direction, is greater than a diameter of the third rolling ball.

11. The aperture module of claim 9, wherein guide grooves of the base and the rotor each has a bottom surface and a side surface extending from the bottom surface in the optical axis direction, and
wherein the side surface is a curved surface.

12. The aperture module of claim 11, wherein a bottom surface of the 1-1 guide groove and a bottom surface of the 2-1 guide groove face each other in the optical axis direction, and a side surface of the 1-1 guide groove and a side surface of the 2-1 guide groove face each other in a direction perpendicular to the optical axis direction, and
a bottom surface of the 1-2 guide groove and a bottom surface of the 2-2 guide groove face each other in the optical axis direction, and a side surface of the 1-2 guide groove and a side surface of the 2-2 guide groove face each other in a direction perpendicular to the optical axis direction.

13. A camera module comprising:
the aperture module of claim 1;
a lens module movable along three axes perpendicular to each other; and
a housing accommodating the lens module,
wherein the aperture module is coupled to, and movable with, the lens module.

14. A portable electronic device comprising:
the camera module of claim 13; and
an image sensor module configured to convert light incident through the lens module into an electrical signal.

15. A camera module comprising:
a lens module movable along three axes perpendicular to each other;
a housing accommodating the lens module; and
an aperture module, coupled to the lens module and movable with the lens module, comprising:
a base;
a rotor rotatably disposed with respect to the base;
a plurality of blades interlockable with the rotor rotating to form incidence holes of various sizes;

an aperture driver including a magnet portion disposed on the rotor, and a coil portion disposed on the base; and a pulling yoke portion disposed on the base to face the magnet portion, wherein the magnet portion comprises a first aperture magnet and a second aperture magnet, spaced apart from each other, the pulling yoke portion includes a first pulling yoke facing the first aperture magnet, and a second pulling yoke facing the second aperture magnet, and an area of the first pulling yoke facing the first aperture magnet is larger than an area of the second pulling yoke facing the second aperture magnet.

16. The camera module of claim 15, further comprising an auxiliary yoke disposed on the base, wherein at least a portion of the auxiliary yoke faces the first aperture magnet, and a direction in which the first aperture magnet and the first pulling yoke face each other is perpendicular to a direction in which the first aperture magnet and the auxiliary yoke face each other.

17. The camera module of claim 16, further comprising a rolling portion disposed between the base and the rotor, wherein the rolling portion includes a first rolling member including a first rolling ball and a second rolling ball, and a second rolling member including a third rolling ball, and wherein the first aperture magnet is disposed between the first rolling ball and the second rolling ball, when viewed in the optical axis direction.

18. The camera module of claim 15, further comprising:

a case coupled to the housing;

an aperture substrate on which the coil portion being mounted and disposed on the base; and a connection substrate including a fixed portion coupled to the case, a moving portion coupled to the base, and a connection portion connecting the fixed portion and the moving portion, wherein when the lens module and the aperture module move together, at least a portion of the connection portion is configured to bend.

19. A portable electronic device comprising:

the camera module of claim 15; and an image sensor module configured to convert light incident through the lens module into an electrical signal.

\* \* \* \* \*